E. L. WILKE.
APPARATUS FOR USE IN THE MANUFACTURE OF SULFURIC ANHYDRID AND THE LIKE.
APPLICATION FILED OCT. 4, 1916.
1,270,997.
Patented July 2, 1918.
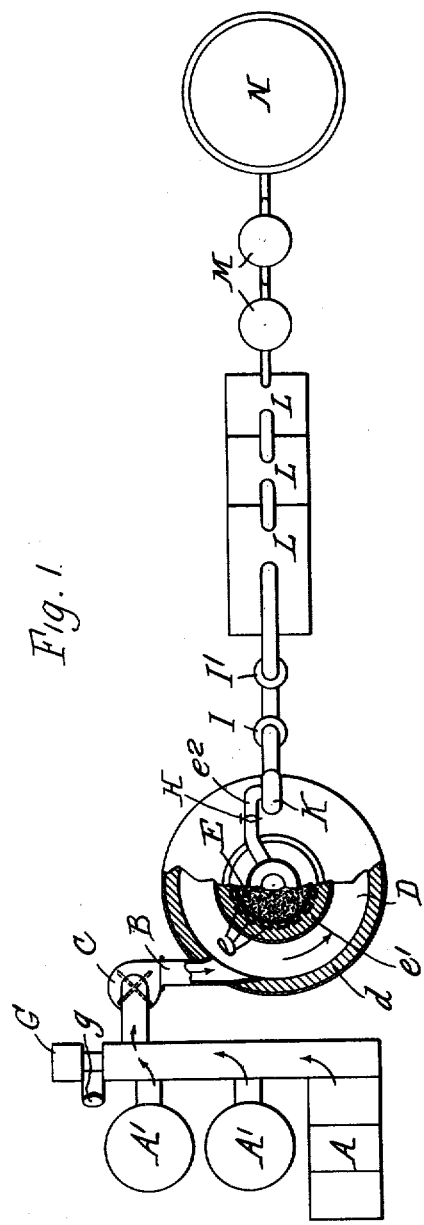
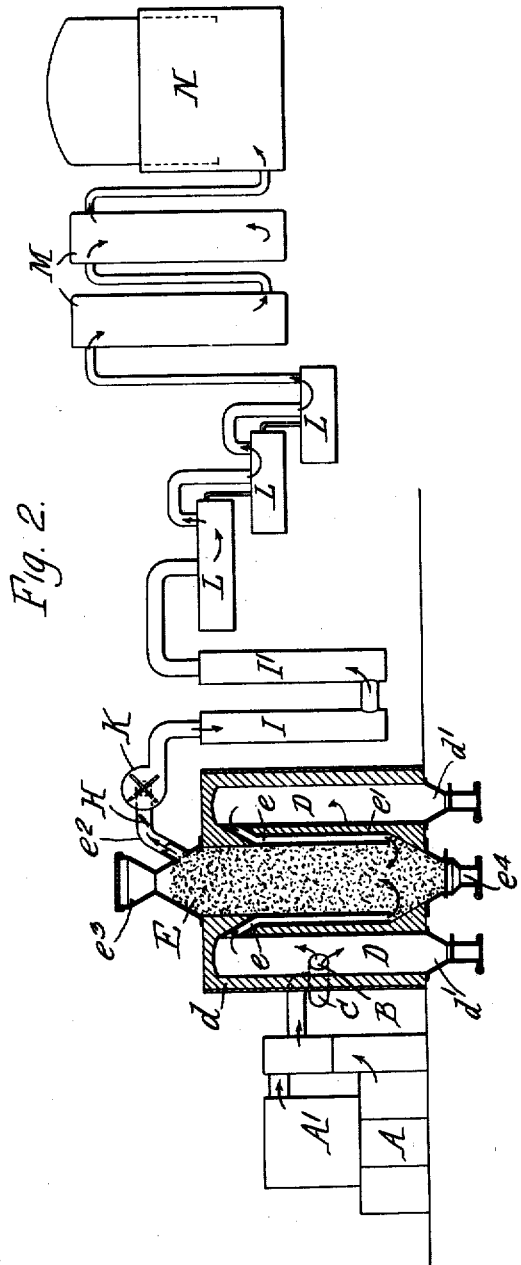

UNITED STATES PATENT OFFICE.

ERWIN L. WILKE, OF BUFFALO, NEW YORK.

APPARATUS FOR USE IN THE MANUFACTURE OF SULFURIC ANHYDRID AND THE LIKE.

1,270,997.  Specification of Letters Patent.  Patented July 2, 1918.

Application filed October 4, 1916. Serial No. 123,680.

*To all whom it may concern:*

Be it known that I, ERWIN L. WILKE, a citizen of the United States, residing at Buffalo, in the county of Erie and State of New York, have invented a new and useful Improvement in Apparatus for Use in the Manufacture of Sulfuric Anhydrid and the like, of which the following is a specification.

This invention relates to apparatus for use in the manufacture of sulfuric anhydrid, sulfuric acid, and the like from the gases of ore roasting furnaces or kilns in the presence of a contact mass or catalytic agent.

The objects of the invention are to produce an improved and simplified apparatus of this kind in which the incoming gases from the roasting furnaces or kilns are converted into sulfuric anhydrid, sulfuric acid and the like without any previous treatment or purifying process; also to provide a converting apparatus which is so constructed as to distribute the incoming gases uniformly to all parts of the contact mass; also to provide an apparatus in which the temperature at which the conversion takes place can be regulated as desired and in which the heat produced during the conversion is absorbed to a large extent by the incoming gases; also to provide a converting apparatus which is so constructed as to remove dust and solid matter from the incoming gases; also to improve the construction and operation of apparatus of this kind in other respects hereinafter specified.

In the accompanying drawings:

Figure 1 is a plan view, partly in section, of an apparatus embodying the invention.

Fig. 2 is an elevation thereof, partly in section.

A A' represent diagrammatically a plurality of ore-roasting furnaces, kilns, or the like which may be of any suitable or usual construction and which are preferably connected to a common pipe or flue B through which the gases may be forced by means of a blower or pump C of any desired kind.

The gases which leave the kilns A A', and which contain sulfurous and sulfuric acid gases ($SO_2$ and $SO_3$), pass through the pipe B into the converting apparatus. This apparatus comprises an outer annular dust separating chamber D, an inner contact chamber E, which contains the contact mass, which may consist of burnt ore or cinders, spent pyrites, iron oxid, or any other suitable material. The outer chamber of the converting apparatus has an outer wall $d$ in which the pipe or flue B terminates in such a manner as to cause the gases from the kilns to enter tangentially into the annular chamber D, in which dust or particles of solid material are removed from the gas. The gases from the flue B enter the annular chamber below the upper portion thereof, preferably about midway between the top and bottom of the chamber, and pass from the outer chamber into the contact chamber through a plurality of passages $e$ formed in a wall $e'$ which is preferably made of fire resisting material and which separates the inner and outer chambers. These passages conduct the gases from the upper portion of the dust separating chamber to the lower portion of the contact chamber, and preferably a plurality of passages are provided in the wall $e'$ arranged at short intervals from each other so that the gases entering the contact chamber will pass to all parts of the contact mass. By means of these passages in the dividing wall $e'$ the gases entering the contact chamber readily absorb heat from the dividing wall, and by locating the passages adjacent to the inner portion of the wall, efficient use is made of the heat generated during the reaction in the contact chamber.

The gases passing into the outer chamber D from the flue B are freed from dust, partly through the centrifugal action due to the rotary movement of the gases in the annular chamber, and partly owing to the fact that the gases, entering from the flue into the relatively large annular space, move slowly enough to permit the dust to separate by gravity, since the gas flows slowly in an upward direction in this chamber. The contact mass within the contact chamber is heated to the temperature at which the best results are obtained, and as the gases pass through the contact mass, the sulfur dioxid is changed to sulfur trioxid. The conversion of the sulfur dioxid produces heat which, with the use of the apparatus shown, is sufficient to continue the conversion of $SO_2$ to $SO_3$ without any additional heat other than that contained in the gases leaving the ore-roasting furnaces. As the gas passes through the annular chamber D and the passages $e$, it absorbs heat which has passed through the wall of the contact chamber, so that the heat liberated in the conversion is used to heat the incoming gases. The construction of the chamber is such that an efficient use is made of the heat generated within the contact chamber. The gases are discharged from the upper end of the contact chamber through a flue or passage $e^2$.

In order to regulate the temperature of the contact mass, a damper H is provided in the discharge passage $e^2$ which may be adjusted to control the flow of gas through the passage. By means of this damper the pressure of gas within the contact chamber can be increased or decreased and the temperature of the contact mass is also dependent upon the pressure if the rate of flow is maintained substantially constant, since with greater pressure greater heat will be produced in the reaction, due probably to the fact that if the pressure is increased, a greater weight of gas is being acted upon by the contact mass if the volume of gas passing through the contact chamber is kept constant. Hence if it is desired to increase the temperature, the damper is actuated to decrease the opening through the flue $e^2$, and vice versa. G represents an auxiliary furnace or heater which may be used for supplying additional heat to the gases for starting the operation or for controlling the temperature of the contact mass, and $g$ represents an adjustable damper for admitting air to the gases for lowering the temperature thereof. The furnace G and damper $g$ may also be employed for regulating the temperature of the contact mass. Other means for controlling the temperature of the mass and of the gases may be employed if desired.

The catalytic or contact material may be fed into and discharged from the contact chamber by any suitable means, such as a feed hopper $e^3$ at the upper end of the contact chamber, and a discharge hopper $e^4$ at the lower end of the contact chamber. $d'$ represents dust hoppers at the lower end of the annular chamber D through which the dust collected in this chamber may be removed.

The flue $e^2$ conducts the gases from the contact chamber into coolers I I' of any suitable construction. Two of these coolers are shown in the drawings, but any desired number may be employed. If desired, a blower or pump K may be employed to draw the gases through the flue $e^2$ from the contact chamber. After the gases have been cooled, they enter the absorbers L of usual construction which contain strong sulfuric acid and in which the $SO_3$ gas is absorbed, three of these absorbers being shown in the construction illustrated. The gases not absorbed in the sulfuric acid of the absorbers may then be disposed of in any desired manner. In case no further use is to be made of these gases they can be discharged to the atmosphere. If desired, they may be passed through filters and driers M of any suitable construction and stored in a gasometer or reservoir, represented at N, from which the gases may be withdrawn as desired.

By means of the blower C, the gases can be forced through the contact chamber under pressure so that gases, when being acted upon by the contact mass, are reduced in volume, thus increasing the capacity of the apparatus. The blower K may be omitted if desired, or may be used in conjunction with the blower C to force the gases under pressure through the absorbers, coolers, etc.

I claim as my invention:

1. In an apparatus for use in the manufacture of sulfuric anhydrid and the like, the combination of an inner contact chamber, an outer chamber surrounding said inner chamber, and a plurality of passages connecting said inner and outer chambers and spaced at intervals about the circumference of said inner chamber to supply gas from said outer chamber to all portions of said inner chamber.

2. In an apparatus for use in the manufacture of sulfuric anhydrid and the like, the combination of an inner contact chamber, an outer chamber surrounding said inner chamber, a dividing wall between said two chambers, and a plurality of passages connecting said two chambers, said passages being formed in said dividing wall and opening at one end into the upper portion of said outer chamber and at the other end into the lower portion of said contact chamber.

3. In an apparatus for use in the manufacture of sulfuric anhydrid and the like, the combination of an inner contact chamber, an outer chamber surrounding said inner chamber, means for admitting gases to said outer chamber below the upper portion thereof, and means for withdrawing the gases from the upper end of said outer chamber and passing the gases to said contact chamber, whereby the dust is separated from the gases in said outer chamber.

4. In an apparatus for use in the manufacture of sulfuric anhydrid and the like, the combination of an inner contact chamber, an outer chamber surrounding said inner chamber, a dividing wall between said two chambers, means for admitting gases to the outer chamber below the upper portion, and passages in said dividing wall through which the gases pass from the upper portion of said outer chamber and discharge into the lower portion of said contact chamber.

5. In an apparatus for use in the manufacture of sulfuric anhydrid and the like, the combination of an inner substantially cylindrical contact chamber, an outer annular chamber surrounding said contact chamber, a tangential inlet for admitting said gas to outer chamber whereby the gas receives a rotary motion in said outer chamber to cause the dust to separate therefrom, and passages connecting said outer and inner chambers.

6. In an apparatus for use in the manufacture of sulfuric anhydrid and the like, the combination of an inner substantially cylindrical contact chamber, an outer annular dust separating chamber surrounding said contact chamber, and means for imparting a rotary movement to the gas in said dust separating chamber, whereby the gas in said outer chamber is freed from dust and absorbs heat from said inner chamber.

7. In an apparatus for use in the manufacture of sulfuric anhydrid and the like, the combination of an inner substantially cylindrical contact chamber, an outer annular chamber surrounding said contact chamber, a tangential inlet for admitting said gas to outer chamber below the upper portion thereof, and passages connecting said outer and inner chambers and conducting the gas from the upper portion of said outer chamber.

8. In an apparatus for use in the manufacture of sulfuric anhydrid and the like, the combination of an inner contact chamber, an outer annular chamber surrounding said contact chamber, a dividing wall between said chambers, means for admitting gas tangentially into said outer chamber below the upper portion thereof, and a plurality of passages in said dividing wall terminating at their upper ends in the upper portion of said outer chamber and at their other ends in the lower portion of said contact chamber.

9. In an apparatus for use in the manufacture of sulfuric anhydrid and the like, the combination with means for supplying sulfur dioxid gas, of a contact chamber adapted to contain a heated contact mass, means for increasing or decreasing the flow of gas to said chamber, and means for controlling the pressure of gas in said contact chamber for increasing the temperature of the contact mass and the gas by increasing the pressure of the gas and for decreasing the temperature of the contact mass and gas by decreasing the pressure of the gas and by maintaining a substantially constant rate of flow of gas through said mass.

10. In an apparatus for use in the manufacture of sulfuric anhydrid and the like, the combination with means for supplying sulfur dioxid gas, of a contact chamber adapted to contain a heated contact mass, means for causing the gas to flow through the contact mass in said chamber, a discharge passage for the gas leaving said contact chamber, and means for regulating the discharge of gas through said discharge passage for controlling the pressure of gas in said contact chamber to maintain constant the volume of gas flowing through said contact mass.

11. In an apparatus for use in the manufacture of sulfuric anhydrid and the like, the combination with means for supplying sulfur dioxid gas, of a contact chamber adapted to contain a heated contact mass, a blower for forcing the gas from said source into said contact chamber and through said contact mass, a discharge passage in said contact chamber for the gas which has passed through said contact mass, and a damper in said discharge passage which can be regulated for increasing and decreasing the opening in said discharge passage for controlling the pressure of gas in said contact chamber, the volume of gas passing through the contact mass being kept substantially constant.

Witness my hand, this 27th day of September, 1916.

ERWIN L. WILKE.

Witnesses:
JNO. A. BURT,
ROBERT STELTOR.

It is hereby certified that in Letters Patent No. 1,270,997, granted July 2, 1918, upon the application of Erwin L. Wilke, of Buffalo, New York, for an improvement in "Apparatus for Use in the Manufacture of Sulfuric Anhydrid and the Like," errors appear in the printed specification requiring correction as follows: Page 3, lines 1 and 22, claims 5 and 7, strike out the word "said."; same page and claims, lines 2 and 23, before the word "outer" insert the word *said;* and that the said Letters Patent should be read with these corrections therein that the same may conform to the record of the case in the Patent Office.

Signed and sealed this 6th day of August, A. D., 1918.

[SEAL.]
R. F. WHITEHEAD,

*Acting Commissioner of Patents.*

Cl. 23--1.